(No Model.)
E. C. DOOLITTLE.
MECHANISM FOR CONVERTING CONTINUOUS ROTARY INTO ALTERNATING ROTARY MOTION.
No. 562,124.                  Patented June 16, 1896.
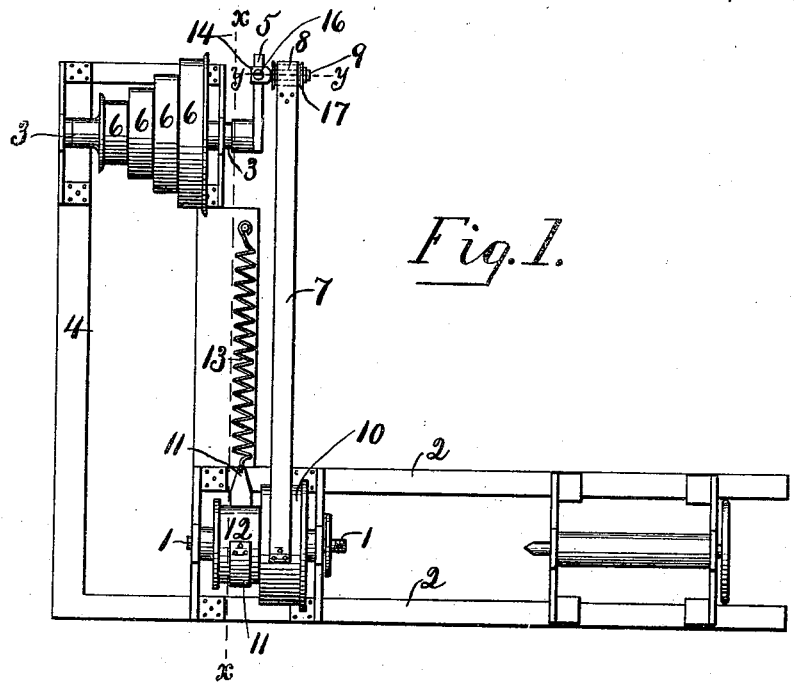
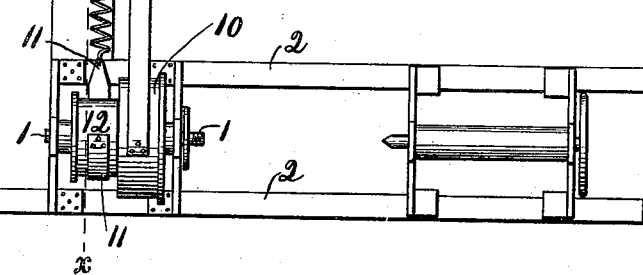
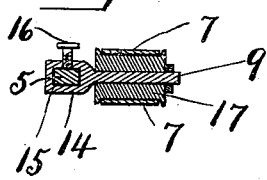
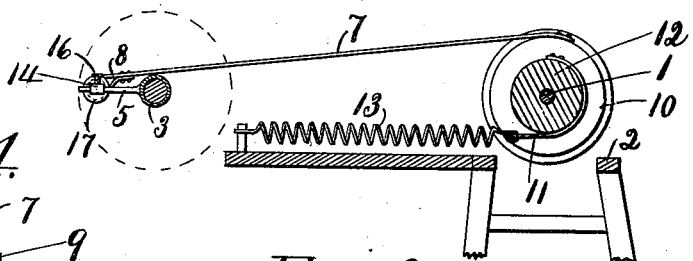
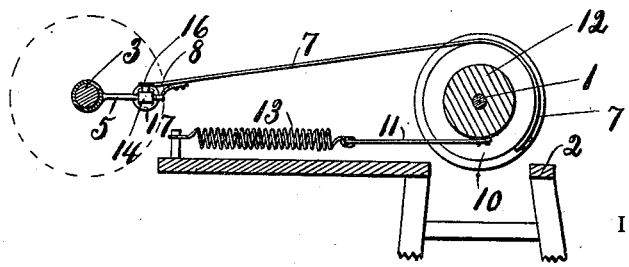
Witnesses.
Walter C Pusey.
A. V. Groupe
Inventor.
Elbridge C. Doolittle,
per Joshua Pusey,
Attorney.

UNITED STATES PATENT OFFICE.

ELBRIDGE C. DOOLITTLE, OF PHILADELPHIA, PENNSYLVANIA, ASSIGNOR, BY DIRECT AND MESNE ASSIGNMENTS, TO ALFRED R. JUSTICE, OF SAME PLACE.

MECHANISM FOR CONVERTING CONTINUOUS ROTARY INTO ALTERNATING ROTARY MOTION.

SPECIFICATION forming part of Letters Patent No. 562,124, dated June 16, 1896.

Application filed March 31, 1896. Serial No. 585,542. (No model.)

*To all whom it may concern:*

Be it known that I, ELBRIDGE C. DOOLITTLE, a citizen of the United States, residing in the city and county of Philadelphia, in the State of Pennsylvania, have invented certain new and useful Improvements in Mechanism for Converting Continuous Rotary Motion into Alternating Rotary Motion, of which the following is a full, clear, and exact description, reference being had to the accompanying drawings, of which—

Figure 1 is a plan view, the parts being in the position when the crank of the driving-shaft is at the limit of its outward throw; Fig. 2, a section on line $x\,x$, Fig. 1; Fig. 3, a section similar to Fig. 2, but the crank-shaft being at the limit of its inward throw; Fig. 4, an enlarged section through the crank-pin, &c., on line $y\,y$, Fig. 1.

The invention relates to means for producing the alternating rotary motion of a shaft from the continuous rotary motion of another shaft; and it consists in the combination, with such two shafts, of peculiar crank and spring controlled flexible strap connections, hereinafter clearly described, whereby during a part of the revolution of the continuously-rotating shaft the other shaft will be caused to turn in one direction, and during another part of the revolution to turn in the opposite direction.

Although the invention is especially designed to be applied to the light lathes used in burnishing silver or other metals, it will be obvious that it may be adapted for other machines wherein it is desired to have an alternating rotary movement of a shaft-carrying tool or an object to be worked.

Referring to the annexed drawings, which represent the improvement as used in connection with a lathe, 1 is the usual lathe shaft or mandrel, suitably journaled in bearings of the frame 2.

3 is a shaft journaled in a frame 4. This shaft has on one end thereof a crank 5, and is driven continuously from a source of power by belts (not shown) passing around one of the usual pulleys 6.

7 is a flexible strap, of leather or the like, one end of which is formed into a loop 8, which passes over the pin 9 of the crank. The other end is secured to the periphery of a fixed pulley 10 on the lathe-shaft 1.

11 is a second flexible strap, one end of which is secured to a fixed pulley 12, also on the same shaft, (or it might be to pulley 10.) The other end of this strap is secured to a spiral spring 13, which, in turn, is fastened at the opposite end to a part of the frame 4, all as clearly shown in the drawings. I prefer to have the pulley 12 of less diameter than the pulley 10, as the spring 13 may thus be shorter or have less extent of movement than if the pulleys were of the same diameter.

As it is desirable to increase or diminish the extent of alternating rotation of the lathe-shaft, I provide a means for securing that result by making the pin 9 adjustable upon the crank 5. One means to this end which I have employed is to secure the pin 9 to a sleeve 14, provided with a slot 15, Fig. 4, through which slot the crank passes, the sleeve 14 being secured in the desired position by a set-screw 16.

Having thus described the construction of the mechanism, its mode of operation is as follows: Taking the parts in the position seen in Figs. 1 and 2, as the shaft 3 continues its rotation and the crank 5 passes the center the strap 11, by the stress of the spring 13, causes the shaft 1 to rotate until the crank has reached the limit of its inward throw, Fig. 3, and as it continues the strap 7 (part of which has been wound around the pulley) is caused to draw upon and so rotate the shaft 1 in the opposite direction against the stress of the spring. In this manner it will be seen the lathe-shaft will be rotated in opposite directions alternately with each revolution of the driving-shaft 3. In lieu of allowing the loop of the strap 7 to bear directly upon the crank-pin 9, I usually, in order to avoid friction and consequent wear, interpose a small loose pulley 17 upon the pin.

I do not limit myself to the precise construction shown, as any skilled mechanic may modify the same without departing from the essential principle of my invention.

Having thus described my invention and its *modus operandi*, I claim as new and desire to secure by Letters Patent—

1. Mechanism for converting continuous rotary motion to alternating rotary motion, consisting of the combination of the continuous rotatable shaft, the crank thereon, a second rotatable shaft in suitable juxtaposition to the former shaft, the flexible-strap connection between said crank and last-mentioned shaft, and the spring-controlled, flexible strap also connected to the latter shaft, all constructed, combined and adapted to operate substantially as and for the purpose set forth.

2. The combination of the continuous rotatable shaft, the crank thereon, a second rotatable shaft in suitable juxtaposition to the former shaft, the flexible-strap connection between said crank and last-mentioned shaft, and the spring-controlled, flexible strap also connected to the latter shaft, together with means for adjusting the extent of movement of said flexible connections and consequently the extent of alternating rotations of the shaft, substantially as set forth.

In testimony whereof I have hereunto affixed my signature in the presence of two subscribing witnesses.

ELBRIDGE C. DOOLITTLE.

Witnesses:
WALTER C. PUSEY,
JOSHUA PUSEY.